United States Patent
Fukuoka et al.

(10) Patent No.: US 11,901,709 B2
(45) Date of Patent: Feb. 13, 2024

(54) GAS-INSULATED SWITCHGEAR

(71) Applicant: Mitsubishi Electric Corporation, Tokyo (JP)

(72) Inventors: Takayuki Fukuoka, Tokyo (JP); Naoaki Inoue, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 2 days.

(21) Appl. No.: 17/772,058

(22) PCT Filed: Mar. 24, 2020

(86) PCT No.: PCT/JP2020/012851
§ 371 (c)(1),
(2) Date: Apr. 26, 2022

(87) PCT Pub. No.: WO2021/191996
PCT Pub. Date: Sep. 30, 2021

(65) Prior Publication Data
US 2022/0368116 A1    Nov. 17, 2022

(51) Int. Cl.
*H02B 13/045* (2006.01)
*H02B 13/035* (2006.01)

(52) U.S. Cl.
CPC ....... *H02B 13/045* (2013.01); *H02B 13/0358* (2013.01)

(58) Field of Classification Search
CPC .......................... H02B 13/045; H02B 13/0358
USPC ....................................................... 361/612
See application file for complete search history.

(56) References Cited

U.S. PATENT DOCUMENTS

| | | | | |
|---|---|---|---|---|
| 6,518,531 B2* | 2/2003 | Arioka | ................. | H02B 13/035 |
| | | | | 218/120 |
| 7,775,818 B2* | 8/2010 | Listl | ..................... | H02B 13/045 |
| | | | | 439/212 |
| 8,462,486 B2* | 6/2013 | Fink | ..................... | H02B 13/035 |
| | | | | 361/612 |
| 10,158,214 B1* | 12/2018 | Yanniello | ................. | H02B 1/22 |
| 10,673,212 B2* | 6/2020 | Inoue | ....................... | H02B 1/22 |

(Continued)

FOREIGN PATENT DOCUMENTS

DE          29501081 U1      3/1995
DE      102014104541 A1    10/2015

(Continued)

OTHER PUBLICATIONS

Extended European Search Report dated Apr. 18, 2023, issued in the corresponding European Patent Application No. 20927656.7, 13 pages.

(Continued)

*Primary Examiner* — Anatoly Vortman
(74) *Attorney, Agent, or Firm* — BUCHANAN INGERSOLL & ROONEY PC

(57) ABSTRACT

Provided is a gas-insulated switchgear having a circuit breaker tank with a reduced size. The gas-insulated switchgear includes: a connection conductor connected to two or more power cables, for each phase, inside the circuit breaker tank; a solid-insulated bus placed outside the circuit breaker tank and connected to the connection conductor via a connection bushing; and an instrument current transformer attached to the solid-insulated bus.

10 Claims, 4 Drawing Sheets

(56) References Cited

U.S. PATENT DOCUMENTS

| | | | |
|---|---|---|---|
| 2003/0155146 A1* | 8/2003 | Alfonsi | H02B 13/0356 174/654 |
| 2013/0279084 A1* | 10/2013 | Harada | H02B 5/06 361/618 |
| 2015/0236485 A1* | 8/2015 | Hashimoto | H02B 5/06 361/618 |
| 2015/0244156 A1* | 8/2015 | Kutalek | H02B 11/04 174/668 |
| 2015/0279603 A1 | 10/2015 | Lang et al. | |
| 2016/0294174 A1 | 10/2016 | Yoshida et al. | |
| 2017/0346263 A1* | 11/2017 | Inoue | H02B 1/24 |
| 2018/0366925 A1* | 12/2018 | Beaver | H02B 13/005 |
| 2020/0328580 A1* | 10/2020 | Inoue | H02B 1/20 |
| 2022/0368116 A1* | 11/2022 | Fukuoka | H02B 13/045 |

FOREIGN PATENT DOCUMENTS

| | | |
|---|---|---|
| EP | 1463174 A1 | 9/2004 |
| EP | 3001521 A1 | 3/2016 |
| JP | S62115712 U | 7/1987 |
| JP | H0879917 A | 3/1996 |
| JP | 2001298816 A | 10/2001 |
| JP | 3203676 U | 3/2016 |
| WO | 2015076029 A1 | 5/2015 |
| WO | 2019123926 A1 | 6/2019 |

OTHER PUBLICATIONS

International Search Report (PCT/ISA/210) with translation and Written Opinion (PCT/ISA/237) dated Jun. 23, 2020, by the Japan Patent Office as the International Searching Authority for International Application No. PCT/JP2020/012851.

* cited by examiner

GAS-INSULATED SWITCHGEAR

TECHNICAL FIELD

The present disclosure relates to a gas-insulated switchgear.

BACKGROUND ART

In order to achieve large rated current such as 2500 A in a gas-insulated switchgear, the sectional area of a power cable needs to be increased. However, there is a limit on increasing the sectional area of one power cable. Therefore, two or more power cables are used. In order to attach an instrument current transformer to such a gas-insulated switchgear having a plurality of power cables, it is proposed that a plurality of power cables are integrated at one connection conductor inside a circuit breaker tank, and an instrument current transformer is attached to the connection conductor in the circuit breaker tank (see, for example, Patent Document 1).

CITATION LIST

Patent Document

Patent Document 1: Japanese Utility Model Registration No. 3203676

SUMMARY OF THE INVENTION

Problems to be Solved by the Invention

In the conventional gas-insulated switchgear, since the instrument current transformer is attached to the connection conductor in the circuit breaker tank, there is a problem that the size of the circuit breaker tank is increased.

The present disclosure has been made to solve the above problem, and an object of the present disclosure is to provide a gas-insulated switchgear having a circuit breaker tank with a reduced size.

Solution to the Problems

A gas-insulated switchgear according to the present disclosure is a gas-insulated switchgear including a circuit breaker tank storing a circuit breaker, and a bus tank storing a bus, the gas-insulated switchgear including: a connection conductor connected to two or more power cables, for each phase, inside the circuit breaker tank; a solid-insulated bus placed outside the circuit breaker tank and connected to the connection conductor via a connection bushing; and an instrument current transformer attached to the solid-insulated bus.

Effect of the Invention

The gas-insulated switchgear according to the present disclosure includes the solid-insulated bus placed outside the circuit breaker tank and connected to the connection conductor via the connection bushing, and the instrument current transformer attached to the solid-insulated bus. Thus, the size of the circuit breaker tank can be reduced.

DESCRIPTION OF EMBODIMENTS

Figure 1:
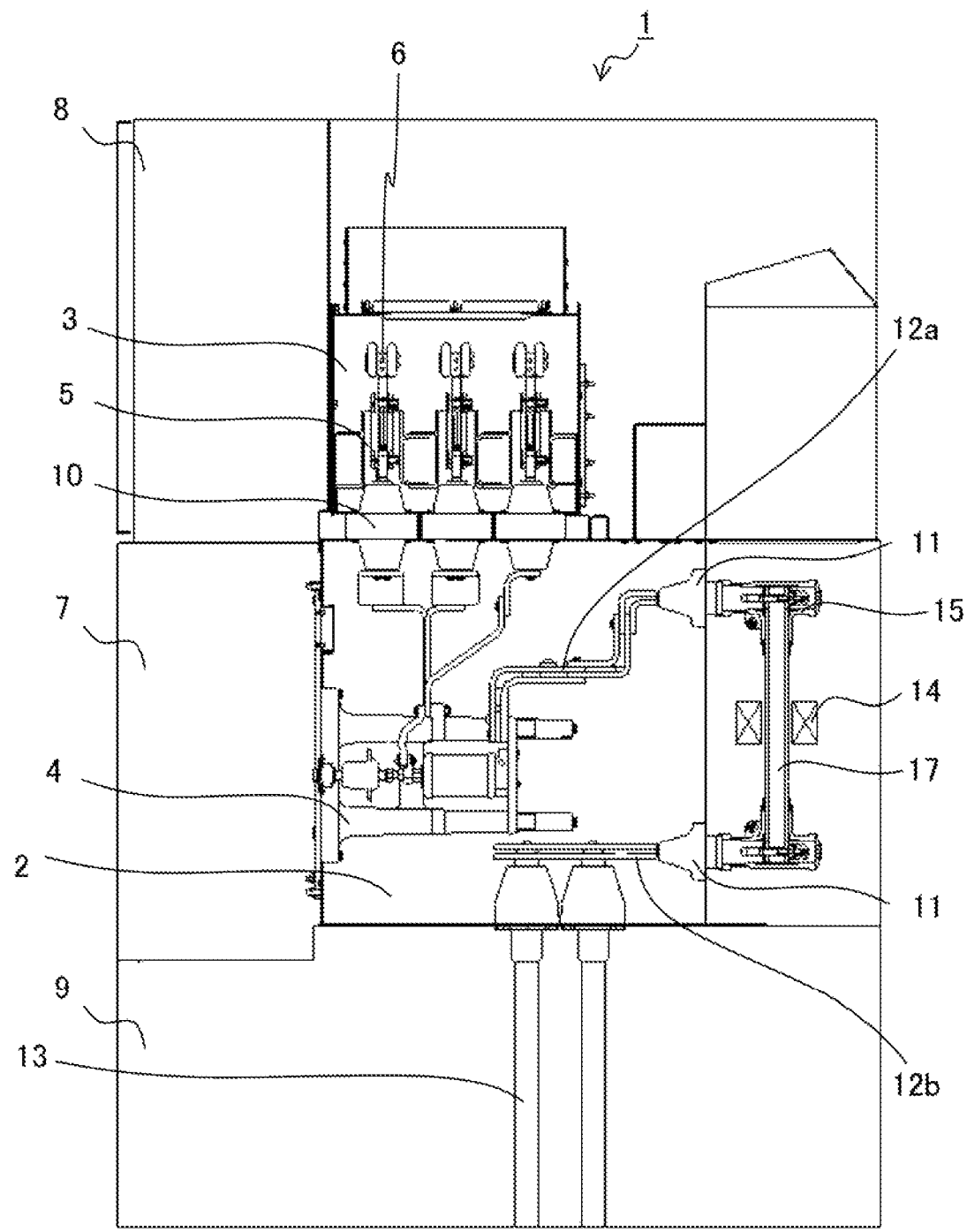
FIG. 1 is a side sectional view showing the structure of a gas-insulated switchgear according to embodiment 1.

Hereinafter, gas-insulated switchgears according to embodiments for carrying out the present disclosure will be described in detail with reference to the drawings. In the drawings, the same reference characters denote the same or corresponding parts.

Embodiment 1

FIG. 1 is a side sectional view showing the structure of a gas-insulated switchgear 1 according to embodiment 1. In FIG. 1, the left side is the front side, and the left-right direction is the depth direction of the gas-insulated switchgear 1.

The gas-insulated switchgear 1 includes a circuit breaker tank 2, and a bus tank 3 placed above the circuit breaker tank 2. Inside the circuit breaker tank 2 in which insulation gas is sealed, a circuit breaker 4 is stored, and inside the bus tank 3 in which insulation gas is also sealed, disconnectors 5 and buses 6 are stored.

An operation chamber 7 storing an operation mechanism and the like is placed in front of the circuit breaker tank 2, and a control chamber 8 storing a control device and the like is placed above the operation chamber 7. A cable chamber 9 storing power cables 13 is placed under the circuit breaker tank 2. The movable side of the circuit breaker 4 is connected to the buses 6 via bushings 10 provided at a partition part between the circuit breaker tank 2 and the bus tank 3 and via the subsequent disconnectors 5.

In back of the circuit breaker tank 2, connection bushings 11 are provided at two upper and lower locations so as to penetrate between the inside and the outside of the circuit breaker tank 2. The upper connection bushing 11 is connected to the fixed side of the circuit breaker 4 via one connection conductor 12a for each phase inside the circuit breaker tank 2. The lower connection bushing 11 is connected to the power cables 13 via one connection conductor 12b for each phase inside the circuit breaker tank 2. The connection conductors 12b for the respective phases are each connected to two or more power cables 13 for each phase. The two connection bushings 11 are connected to each other via a solid-insulated bus 15 outside the circuit breaker tank 2. An instrument current transformer 14 is attached to a solid-insulated bus busbar 17 composing the solid-insulated bus 15.

Figure 2:
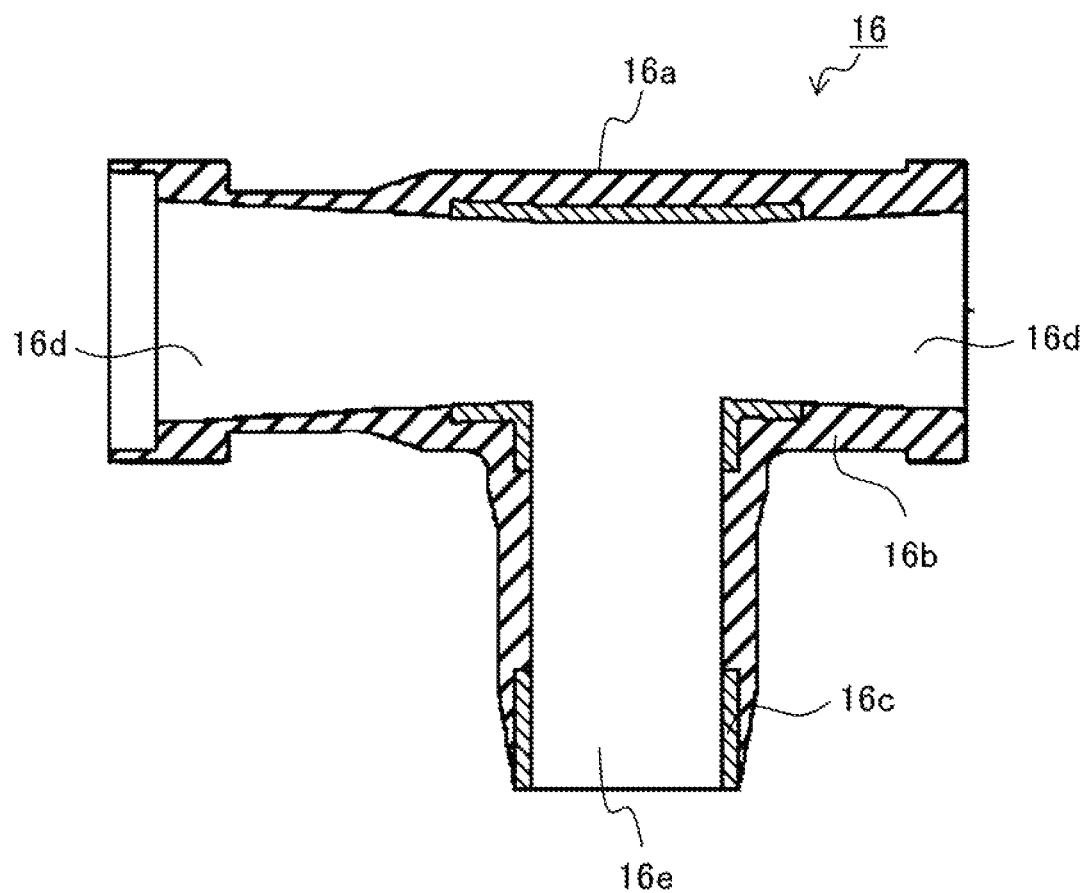
FIG. 2 is a sectional view of a solid-insulated bus adapter according to embodiment 1.
Figure 3:
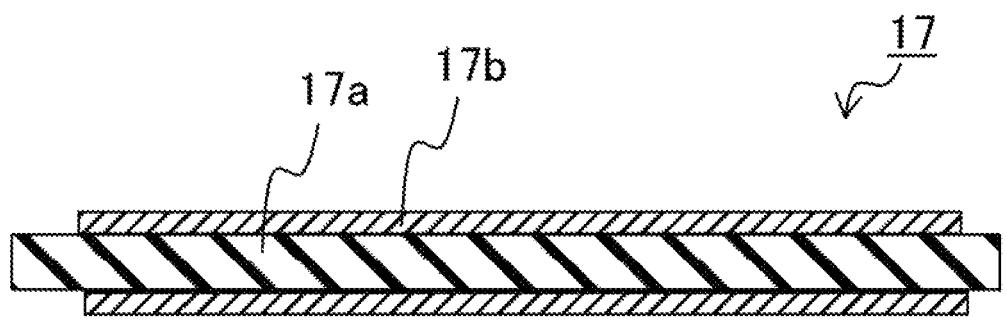
FIG. 3 is a sectional view of a solid-insulated bus busbar according to embodiment 1.

FIG. 2 is a sectional view of a solid-insulated bus adapter 16 composing the solid-insulated bus 15. The solid-insulated bus adapter 16 has a through hole therein and is formed in a T shape. The outer surface of the solid-insulated bus adapter 16 is coated with a surface conductive layer 16a which is grounded. The solid-insulated bus adapter 16 has, on the inner side, an internal insulating layer 16b, in which internal conductive layers 16c are partially formed. Parts formed in taper shapes toward the center from both ends are plug-in portions 16d, and a straight cylindrical part on the lower side is a fitting portion 16e. The fitting portion 16e is a portion to be connected with the solid-insulated bus busbar 17. FIG. 3 is a sectional view of the solid-insulated bus busbar 17 composing the solid-insulated bus 15. The solid-insulated bus busbar 17 is formed by coating the outer surface of a metal conductor 17a with an insulating layer 17b.

Figure 4:
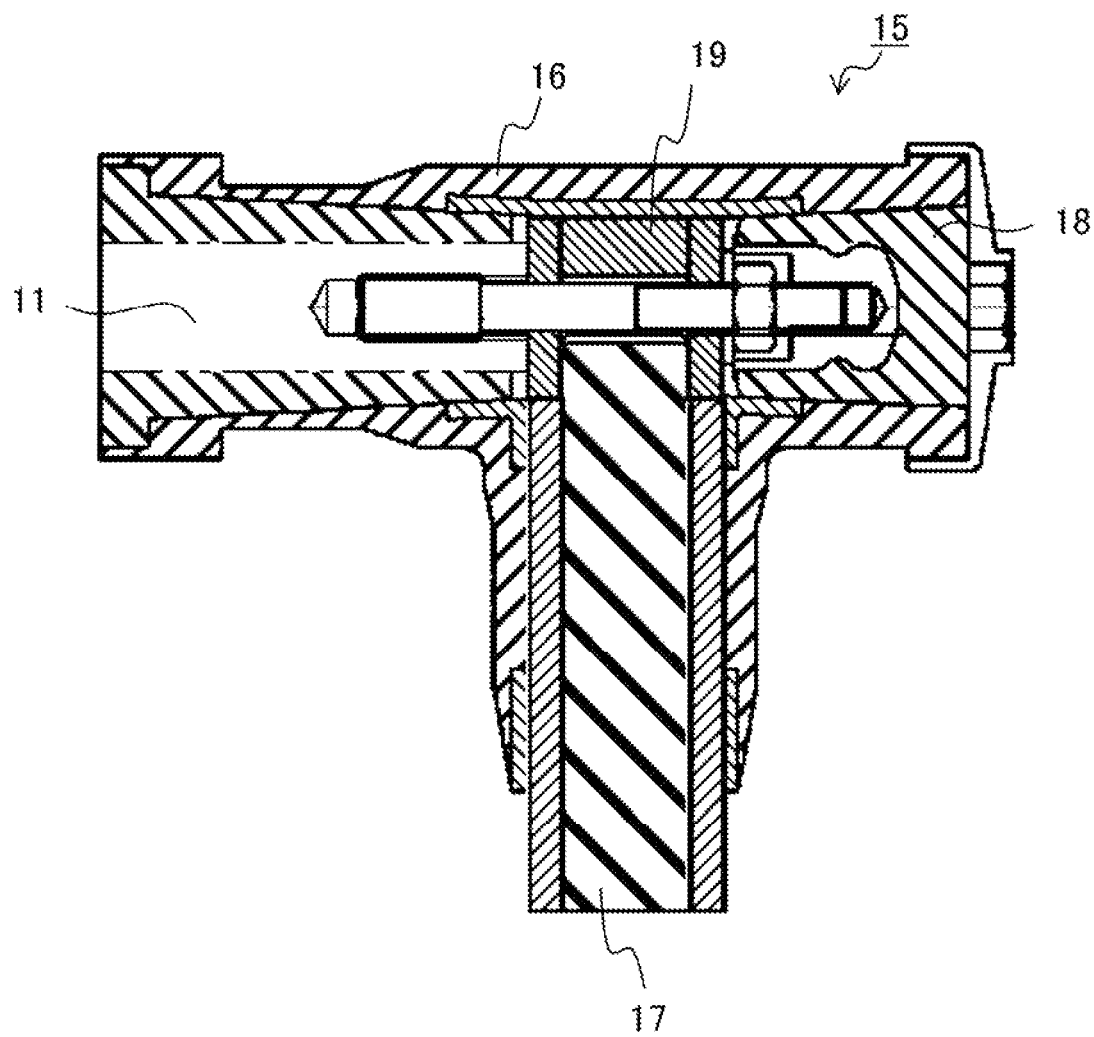
FIG. 4 is a sectional view of a solid-insulated bus according to embodiment 1.

FIG. 4 is a sectional view showing a state in which the solid-insulated bus 15 composed of the solid-insulated bus adapter 16, the solid-insulated bus busbar 17, an insulation plug 18, and a contact 19 is connected to the connection bushing 11. In the two plug-in portions 16d at both ends of the solid-insulated bus adapter 16 shown in FIG. 2, the connection bushing 11 and the insulation plug 18 are plug-in connected to the solid-insulated bus adapter 16. The solid-insulated bus busbar 17 is connected to the fitting portion 16e on the lower side of the solid-insulated bus adapter 16, and the connection bushing 11 and the insulation plug 18 are connected to each other via the contact 19.

In the conventional gas-insulated switchgear, an instrument current transformer is attached to a non-insulated connection conductor inside a circuit breaker tank. Therefore, it is necessary to use an instrument current transformer for high-voltage use, which has a large size and is expensive. In order to use such an instrument current transformer for high-voltage use, insulation using epoxy resin which has high insulation property is needed. In addition, in the conventional gas-insulated switchgear, since the instrument current transformer is attached inside the circuit breaker tank in which insulation gas is sealed, it is necessary to perform gas processing for the circuit breaker tank at the time of performing replacement or maintenance of the instrument current transformer, thus requiring a time for work.

In the gas-insulated switchgear 1 according to embodiment 1, as shown in FIG. 1, the instrument current transformer 14 is attached to the solid-insulated bus 15 placed outside the circuit breaker tank 2 in which insulation gas is sealed. Thus, the size of the circuit breaker tank 2 can be reduced and the manufacturing cost can be reduced. Further, at the time of performing replacement or maintenance of the instrument current transformer 14, gas processing for the circuit breaker tank 2 is not needed. Thus, as compared to the conventional gas-insulated switchgear, ease of maintenance is improved and the work time for performing replacement or maintenance can be shortened.

Further, in the gas-insulated switchgear 1 according to embodiment 1, inside the circuit breaker tank 2 in which insulation gas is sealed, the connection conductor 12b is connected to two or more power cables 13, for each phase, and the connection conductor 12b is connected via the connection bushing 11 to the solid-insulated bus 15 placed outside the circuit breaker tank 2. The outer surface of the solid-insulated bus adapter 16 composing the solid-insulated bus 15 is coated with the grounded surface conductive layer 16a, the solid-insulated bus busbar 17 coated with the insulating layer 17b is connected to the solid-insulated bus adapter 16, and the instrument current transformer 14 is attached to the solid-insulated bus busbar 17. In this structure, an instrument current transformer for high-voltage use need not be used for the instrument current transformer 14 to be attached to the solid-insulated bus busbar 17, and an instrument current transformer for low-voltage use can be used. The instrument current transformer for high-voltage use has a large size and is expensive, but since the instrument current transformer for low-voltage use can be used, the instrument current transformer can be downsized and the cost therefor is reduced.

As described above, in the gas-insulated switchgear 1 according to embodiment 1, the connection conductor 12b connected to two or more power cables 13 for each phase is connected via the connection bushing 11 to the solid-insulated bus 15 placed outside the circuit breaker tank 2, and the instrument current transformer 14 is attached to the solid-insulated bus 15. Thus, the size of the circuit breaker tank 2 can be reduced.

Embodiment 2

Figure 5:
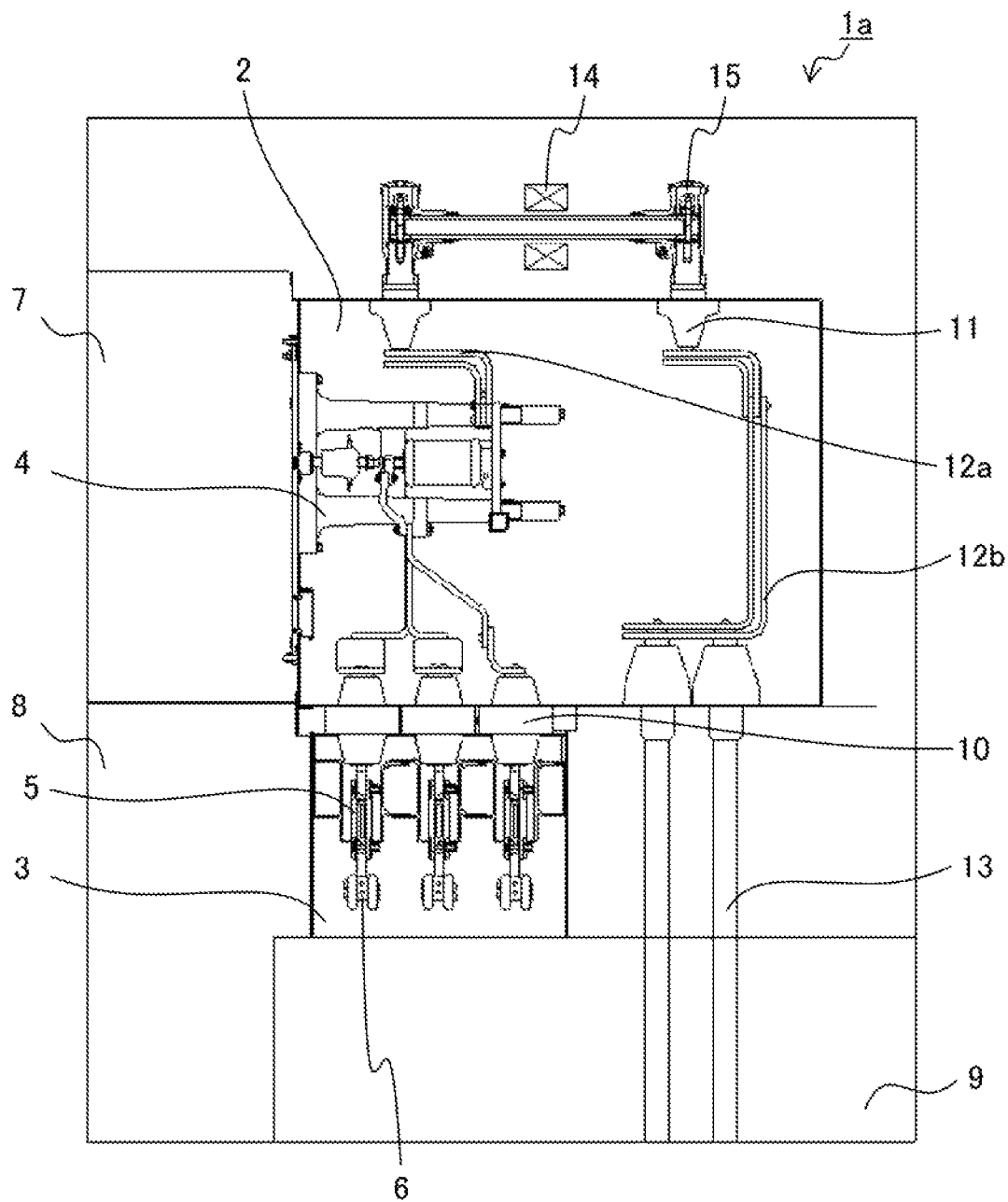
FIG. 5 is a side sectional view showing the structure of a gas-insulated switchgear according to embodiment 2.

FIG. 5 is a side sectional view showing the structure of a gas-insulated switchgear 1a according to embodiment 2. In FIG. 5, the left side is the front side, and the left-right direction is the depth direction of the gas-insulated switchgear 1a. The gas-insulated switchgear 1a includes the circuit breaker tank 2, and the bus tank 3 placed under the circuit breaker tank 2. Inside the circuit breaker tank 2 in which insulation gas is sealed, the circuit breaker 4 is stored, and inside the bus tank 3 in which insulation gas is also sealed, the disconnectors 5 and the buses 6 are stored.

The operation chamber 7 storing an operation mechanism and the like is placed in front of the circuit breaker tank 2, and the control chamber 8 storing a control device and the like is placed under the operation chamber 7. The cable chamber 9 storing the power cables 13 is placed under the bus tank 3. The movable side of the circuit breaker 4 is connected to the buses 6 via the bushings 10 provided at a partition part between the circuit breaker tank 2 and the bus tank 3 and via the subsequent disconnectors 5.

The connection bushings 11 are provided at both ends of an upper part of the circuit breaker tank 2 so as to penetrate between the inside and the outside of the circuit breaker tank 2. The two connection bushings 11 are connected to each other via the solid-insulated bus 15 outside the circuit breaker tank 2. The solid-insulated bus 15 is composed of the solid-insulated bus adapter 16, the solid-insulated bus busbar 17, the insulation plug 18, and the contact 19, and the instrument current transformer 14 is attached to the solid-insulated bus busbar 17.

Comparing the gas-insulated switchgear 1a of embodiment 2 shown in FIG. 5 with the gas-insulated switchgear 1 of embodiment 1 shown in FIG. 1, there is a difference in that the bus tank 3 is placed under the circuit breaker tank 2. Since the bus tank 3 is placed under the circuit breaker tank 2, both of the power cables 13 and the buses 6 for which installation work is needed at a client site are integrated at the lower part of the gas-insulated switchgear 1a. Thus, the time for installation work at the client site can be shortened and work safety is improved. In addition, the power cables 13 in the gas-insulated switchgear 1a of embodiment 2 shown in FIG. 5 are mounted at a higher position than the power cables 13 in the gas-insulated switchgear 1 of embodiment 1 shown in FIG. 1. Thus, also in installation of the power cables 13 alone, the work time can be shortened owing to expansion of the installation space.

As described above, in the gas-insulated switchgear 1a according to embodiment 2, since the bus tank 3 is placed under the circuit breaker tank 2, a time for installation work at the client site can be shortened.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1, 1a gas-insulated switchgear
2 circuit breaker tank
3 bus tank
4 circuit breaker
5 disconnector
6 bus
7 operation chamber
8 control chamber
9 cable chamber
10 bushing
11 connection bushing
12a, 12b connection conductor
13 power cable
14 instrument current transformer
15 solid-insulated bus
16 solid-insulated bus adapter
16a surface conductive layer
16b internal insulating layer
16c internal conductive layer
16d plug-in portion
16e fitting portion
17 solid-insulated bus busbar
18 insulation plug
19 contact

The invention claimed is:

1. A gas-insulated switchgear including a circuit breaker tank storing a circuit breaker, and a bus tank storing a bus, the gas-insulated switchgear comprising:
a connection electrical conductor connected to two or more electrical power cables, for each phase, inside the circuit breaker tank;
a solid-insulated bus placed outside the circuit breaker tank and connected to the connection electrical conductor via a connection bushing; and
an instrument current transformer attached to the solid-insulated bus, wherein
the solid-insulated bus includes a solid-insulated bus busbar and a solid-insulated bus adapter electrically connected to the connection electrical conductor via the connection bushing,
an outer surface of the solid-insulated bus adapter is coated with an electrically conductive surface layer which is grounded, and
the instrument current transformer is attached to the solid-insulated bus busbar.

2. The gas-insulated switchgear according to claim 1, wherein
the solid-insulated bus busbar is a metal electrical conductor coated with an electrically insulating layer.

3. The gas-insulated switchgear according to claim 1, wherein
the instrument current transformer is for low-voltage use.

4. The gas-insulated switchgear according to claim 1, wherein
the bus tank is placed above the circuit breaker tank.

5. The gas-insulated switchgear according to claim 1, wherein
the bus tank is placed under the circuit breaker tank.

6. The gas-insulated switchgear according to claim 3, wherein
the instrument current transformer is for low-voltage use.

7. The gas-insulated switchgear according to claim 2, wherein
the bus tank is placed above the circuit breaker tank.

8. The gas-insulated switchgear according to claim 3, wherein
the bus tank is placed above the circuit breaker tank.

9. The gas-insulated switchgear according to claim 2, wherein
the bus tank is placed under the circuit breaker tank.

10. The gas-insulated switchgear according to claim 3, wherein
the bus tank is placed under the circuit breaker tank.

* * * * *